United States Patent Office 3,658,802
Patented Apr. 25, 1972

3,658,802
CEPHALOSPORINE DERIVATIVES AND PROCESS
Rene Heymes, Romainville, Gaston Amiard, Thorigny, and Gerard Nomine, Noisy-le-Sec, France, assignors to Roussel-UCLAF, Paris, France
No Drawing. Continuation-in-part of application Ser. No. 697,589, Jan. 15, 1968. This application June 26, 1969, Ser. No. 836,988
Claims priority, application France, Jan. 18, 1967, 91,612
Int. Cl. C07d 99/24
U.S. Cl. 260—243 C
10 Claims

ABSTRACT OF THE DISCLOSURE

This invention relates to a cephalosporine derivative of the formula

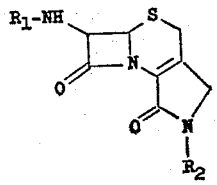

wherein $R_1$ represents the acyl of an organic acid and $R_2$ represents a member selected from the group consisting of hydrogen, alkyl, substituted alkyl, aryl and substituted aryl. These compounds have particularly marked antibiotic properties, particularly, a remarkable activity against staphylococci.

REFERENCE TO A PRIOR APPLICATION

This application is a continuation-in-part of our co-pending application Ser. No. 697,589, filed Jan. 15, 1968, now abandoned.

OBJECTS OF THE INVENTION

An object of the invention is the obtention of novel cephalosporine derivatives having an antibiotic activity.

Another object of the invention is the obtention of a racemic or optically-active cephalosporine derivative of the formula

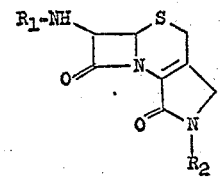

wherein $R_1$ represents the acyl of an organic acid and $R_2$ represents a member selected from the group consisting of hydrogen, alkyl, substituted alkyl, aryl and substituted aryl.

When $R_1$ carries carboxyl, sulfonyl or amino groups as substituents, the therapeutically-acceptable salts derived therefrom are also an object of the invention.

A further object of the invention is the obtention of the following compounds:

the γ-lactam of L - 7 - (2'-thienyl-acetamido)-3-aminomethyl-ceph-3-eme-4-carboxylic acid;
the γ-lactam of DL-6H,7H-cis-7-(o.-carboxy-phenylacetamido) - 3-aminomethyl-ceph-3-eme-4-carboxylic acid and its alkali metal salts;
the γ-lactam of DL-6H,7H-cis-7-(p-sulfonyl-phenylacetamido) - 3 - aminomethyl-ceph-3-em-4-carboxylic acid and its alkali metal salts;
the γ-lactam of DL-6-H,7H-cis-7-(p.-amino-phenylacetamido) - 3-aminomethyl-ceph-3-eme-4-carboxylic acid and its hydrochloric acid addition salts;
the γ-lactam of L(+)-6H,7H-cis-7-(p.-amino-phenylacetamido) - 3 - aminomethyl-seph-3-eme-4-carboxylic acid and its hydrochloric acid addition salt.

A still further object of the invention is the development of a process for the production of the above cephalosporine derivatives which comprises the steps of lactamizing a compound of the formula

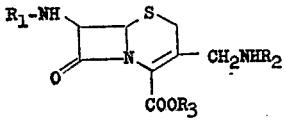

wherein $R_1$ represents the acyl of an organic acid, $R_2$ represents a member selected from the group consisting of hydrogen, alkyl, substituted alkyl, aryl and substituted aryl, and $R_3$ represents a member selected from the group consisting of hydrogen, alkyl, substituted alkyl, aryl and substituted aryl, and recovering said cephalosporine derivative optionally in the form of a corresponding therapeutically-acceptable salt.

A further object of the invention is the obtention of the intermediate compound of the general Formula III

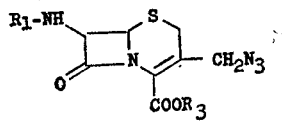

(III)

wherein $R_1$ is the acyl of an organic radical and $R_3$ represents a member selected from the group consisting of hydrogen, alkyl, substituted alkyl, aryl and substituted aryl.

A yet further object of the invention is to provide novel therapeutic compositions.

It is an additional object of the invention to provide a novel method of combatting microbial infections in humans and animals.

These and other objects of the invention will become more apparent as the description thereof proceeds.

DESCRIPTION OF THE INVENTION

These objects of the invention have been achieved in the obtention of new racemic or optically-active derivatives of cephalosporine of the general Formula I

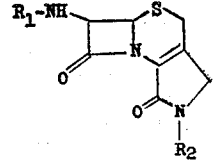

(I)

wherein $R_1$ represents the acyl of an organic acid and $R_2$ represents a member selected from the group consisting of hydrogen, alkyl, substituted alkyl, aryl and substituted aryl, and their therapeutically-acceptable salts.

The new compounds of the general Formula I exhibit particularly marked antibiotic properties. Thus, the γ-lactam of L-7-(2'-thienyl-acetamido)-3-aminomethylceph-3-eme-4-carboxylic acid, The γ-lactam of DL-6H,7H-cis-7-(o.-carboxy-phenyl-acetamido)-3-aminomethyl-ceph-3-eme-4-carboxylic acid and its alkali metal salts, the γ-lactam of DL-6H,7H- cis-7-(p.-sulfonyl - phenylacetamido) - 3 - aminomethyl-ceph-3-eme-4-carboxylic acid and its alkali metal salts, the γ - lactam of DL-6H,7H-cis-7-(p. - amino - phenylacetamido)-3-aminomethyl-ceph-3-eme-4-carboxylic acid and its hydrochloric acid addition salts, and the γ-lactam of L(+) - 6H,7H - cis - 7 - (p.-amino-phenylacetamido)-3-aminomethyl-ceph-3-eme-4-carboxylic acid and its hydrochloric acid addition salt are endowed with a particularly interesting antibiotic activity in vivo against the staphylococci.

The process for the preparation of the new derivatives of cephalosporine of the general Formula I, which is also an object of the invention, comprises the lactamization of a compound of the general Formula II

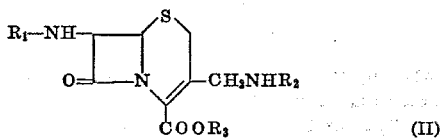

wherein $R_1$ and $R_2$ are as defined above, $R_3$ represents hydrogen, a substituted or unsubstituted alkyl or aryl radical, and the isolation of the desired product, optionally in the form of a corresponding therapeutically-acceptable salt.

Preferably, $R_1$ represents the acyl of a lower alkanoic acid, such as acetic, propionic or caproic acid; or $R_1$ represents the acyl of a substituted lower alkanoic acid, for example, a thienyl-lower alkanoic acid, such as 2-thienyl-acetic acid; or $R_1$ represents the acyl of an aryl-lower alkanoic acid, where the aryl may be substituted with free or salified carboxylic, sulfonyl or amino groups, for example, carboxyphenyl-lower alkanoic acids, sulfonyl-phenyl-lower alkanoic acids; aminophenyl-lower alkanoic acids, their therapeutically-acceptable salts, and phenyl-lower alkanoic acids, such as phenylacetic acid, o.-carboxyphenylacetic acid, p.-sulfonyl-phenylacetic acid and p.-amino-phenylacetic acid; $R_2$ represents hydrogen, lower alkyl such as methyl, phenyl and phenyl-lower alkyl, such as benzyl; and $R_3$ represents hydrogen, a lower alkyl, such as methyl, ethyl, propyl, or a phenyl-lower alkyl, such as benzyl.

The process of the invention is advantageously performed as follows:

(1) The lactamization is effected in an organic solvent, such as a lower alkanol, a chlorinated hydrocarbon solvent, a nitrated lower alkane, acetone, dimethylformamide, tetrahydrofuran or acetonitrile, by gentle heating.

(2) The lactamization is effected by the action of a lactamizing agent in an organic solvent, such as dimethylformamide, or a nitrated lower alkane, such as nitromethane.

(3) The lactamizing agent is a dialkyl or dicycloalkyl carbodiimide, such as dicyclohexylcarbodiimide.

(4) When $R_1$ carried carboxyl or sulfonyl groups as substituents, the compounds of Formula I may be converted into the corresponding therapeutically-acceptable salts, preferably the alkali metal salts, according to conventional methods.

(5) When $R_1$ carries amino groups as substituents, the compounds of Formula I may be converted into the corresponding therapeutically-acceptable acid addition salts, such as the hydrochloride, according to conventional methods.

As has been previously indicated, the compounds of Formula I may be in the racemic or optically-active form, depending on the structure of the starting material. For example, the compounds of Formula I may be the D1, D(—) or L(+) derivatives. The optically-active and racemic forms of the compounds of Formula I are all active as antibiotics.

The starting compounds of general Formula II may be obtained by reducing the corresponding azido derivatives of the general Formula III

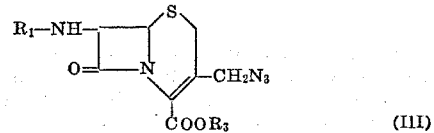

wherein $R_1$ and $R_3$ are as defined above, the formed compound of general Formula II being eventually reacted, when $R_2$=H, with an alkylating agent or an arylating agent.

The reduction of the azido derivatives of general Formula III is effected, either by hydrogenation in the presence of a catalyst, such as platinum oxide, or with a metallic reducing agent, such as zinc, tin or iron in a mineral acid, such as hydrochloric acid or sulfuric acid, or in an organic acid, such as acetic acid or propionic acid.

The following examples illustrate the invention without-however, limiting it in any respect.

EXAMPLE 1

Preparation of γ-lacatam of L-7-(2'-thienylacetamido)-3-aminomethyl-ceph-3-eme-4-carboxylic acid from the methyl ester of the amine acid 3.4 gm. of the methyl ester of L-7-(2'-thienylacetamido)-3-aminomethyl-ceph-3-eme-4-carboxylic acid are introduced into 8 cc. of nitromethane and heated on the water bath at 85° C. to 90° C. for 10 minutes.

The reaction mixture is iced and the precipitate is filtered with suction, dried and 1.25 gm. of product is recovered. From the mother liquors, a second yield of the product is obtained on decolorization with animal charcoal, filtration and standing for a night. The two combined yields are recrystallized from dimethylsulfoxide, then from methanol to obtain, with an overall yield of the order of 50%, the desired γ-lactam, which occurs in the form of solvated white needles containing 0.7% of methanol, melting over 280° C., very sparingly soluble in acetone and chloroform, insoluble in water and in most organic solvents, and soluble in dimethylsulfoxide and dimethylformamide.

The γ-lactam of L-7-(2'-thienyl-acetamido)-3 - aminomethyl-ceph-3-eme-4-carboxylic acid exhibits a rotatory power of +153°±2° (c.=1% in dimethylformamide).

As far as is known, this compound is not described in the literature.

The methyl ester of L-7-(2'-thienyl - acetamido) - 3-aminomethyl-ceph-3-eme-4-carboxylic acid is prepared as follows:

6 gm. of the sodium salt of L-7-(2'-thienyl-acetamido)-3-acetoxy-methyl-ceph-3-eme-4-carboxylic acid (Chauvette et al., J. Am. Chem. Soc., 84, 3401 [1962]) are introduced into 60 cc. of distilled water. 2.1 gm. of sodium azide and 6 gm. of monosodium phosphate added thereto. The reaction mixture is placed under an atmosphere of nitrogen and heated on a water-bath at 85° C. to 90° C. for half an hour. After cooling, 50 cc. of chloroform are added thereto; then the medium is acidified by adding 5 cc. of concentrated hydrochloric acid. The acidified medium is extracted with chloroform to obtain a solution of L-7-(2'-thienyl-acetamido)-3-azidomethyl-ceph-3-eme-4 - carboxylic acid, which is used as such for the esterification. To isolate the acid-azide, it suffices to evaporate this solution to dryness under reduced pressure.

To this solution, 25 cc. of a solution of diazomethane in methylene chloride, which contains about 13 gm. of diazomethane per liter, are added. The reaction mixture is agitated for 15 minutes at room temperature; then sodium sulfate is added thereto. The mixture is then filtered with suction and reduced to a small volume whereupon the product forms a mass.

This product is dissolved in 20 cc. of methanol with reflux and the solution is distilled until crystallization commences. The crystallizing mixture is iced, and the formed product is triturated and filtered with suction to obtain 3.4 gm. of the methyl ester of L-7-(2'-thienyl-acetamido)-3-azidomethyl-ceph-3-eme-4-carboxylic acid.

The product melts at 150° C. and is utilized as such.

For the purpose of analysis, a sample is prepared by recrystallization from a mixture of methylene chloride and methanol (M.P. 153° C.). The product occurs as white needles, soluble in acetone and chloroform, sparingly soluble in alcohols and insoluble in water and in diluted aqueous acids and alkalis.

Analysis.—Calculated for $C_{15}H_{15}O_4N_5S_2$ (percent): molecular weight=393.44. C, 45.78; H, 3.84; N, 17.81; S, 16.30. Found (percent): C, 46.1; H, 4.0; N, 17.8; S, 16.1.

As far as is known this compound is not described in the literature.

The above-obtained 3.4 gm. of the methyl ester of L - 7-(2'-thienyl-acetamido)-3-azidomethyl-ceph-3-eme-4-carboxylic acid are introduced into 50 cc. of anhydrous dioxan, heated on the water-bath and placed under an atmosphere of nitrogen.

3.4 gm. of powdered zinc, then dropwise, 30 cc. of N-hydrochloric acid are added thereto with agitation over a period of about 20 minutes. The reaction mixture is agitated for 15 minutes more, than iced, poured into a solution saturated with sodium bicarbonate and extracted with ethyl acetate. The extracts are evaporated to dryness in vacuo to obtain 3.4 gm. of the methyl ester of the L-7-(2'-thienyl-acetamido) - 3 - aminomethyl-ceph-3-eme-4-carboxylic acid.

EXAMPLE 2

Preparation of the γ-lactam of L-7-(2'-thienyl-acetamido)-3-aminomethyl-ceph-3-eme-4-carboxylic acid from the amine acid 70 mg. of L-7-(2'-thienyl-acetamido)-3-aminomethyl-ceph-3-eme-4-carboxylic acid are introduced into 0.5 cc. of anhydrous dimethylformamide. 44 gm. of dicyclohexylcarbodiimide and 1 drop of pyridine are added. The reaction mixture is agitated at room temperature overnight. 5 cc. of hot nitromethane are added. The whole is agitated, iced and the urea formed is filtered with suction. Water, then ethyl acetate are added to the filtrate. The organic phase is decanted, washed with water, dried, decolorized with animal charcoal and concentrated to a small volume. The residual oil is crystallized in 2 cc. of methanol with reflux. A first yield of 13 mg. of the desired γ-lactam is obtained, which is purified by dissolving in dimethylformamide and precipitating with methanol.

The product, the γ-lactam of L-7-(2'-thienyl-acetamido)-3-aminomethyl-ceph-3-eme-4-carboxylic acid, has a rotatory power of $+153° \pm 2°$ (c.=1% in dimethylformamide) is in every respect identical with that obtained in the preceding example.

The L-7-(2'-thienyl-acetamido)-3-aminomethyl-ceph-3-eme-4-carboxylic acid may be prepared as follows:

920 mg. of the L-7-(2'-thienyl-acetamido)-3-azidomethyl-ceph-3-eme-4-carboxylic acid (the obtention of which has been indicated in the preceding example) are introduced into 10 cc. of ethanol. 1 gm. of powdered tin, then 2.5 cc. of concentrated hydrochloric acid are added dropwise. This introduction is effected very slowly over a period of half an hour with vigorous agitation.

The whole is then poured into water and filtered with suction. The filtrate is saturated with hydrogen sulfide and filtered with suction. This filtrate is decolorized with animal charcoal, filtered and evaporated to dryness in vacuo. The residue is taken up with 10 cc. of alcohol and admixed dropwise with 1 cc. of pyridine. The precipitate is filtered with suction and dried to obtain 253 mg. of L-7-(2'-thienyl-acetamido) - 3 - aminomethyl-ceph-3-eme-4-carboxylic acid.

EXAMPLE 3

Preparation of the γ-lactam of DL-6H,7H-cis-7-(o.-carboxy-phenylacetamido) - 3 - aminomethyl-ceph-3-eme-4-carboxylic acid and its alkali metal salts Using the same procedure as described in Example 1, but starting from the methyl ester of DL-6H,7H-cis-7-(o.-carboxy-phenylacetamido) - 3-aminomethyl-ceph-3-eme-4-carboxylic acid, the γ-lactam of DL-6H,7H-cis-7-(o.-carboxyphenylacetamido) - 3 - aminomethyl-ceph-3-eme-4-carboxylic acid was obtained in the form of colorless crystals, soluble in dimethylformamide and dimethylsulfoxide slightly soluble in the usual organic solvents, and melting over 260° C.

Analysis.—Calculated for $C_{17}H_{15}O_5N_3S$ (percent): Molecular weight=373.77. C, 54.68; H, 4.05; N, 11.26; S, 8.58. Found (percent): C, 54.9; H, 4.2; N, 11.0; S, 8.7.

I.R. Spectrum (in nujol): β-lactam at 1767 cm.⁻¹; γ-lactam, amide and acid at 1678, 1704 and 1658 cm.⁻¹; 2nd amide at 1532 cm.⁻¹; absorption in the associated OH/NH region; aromatic acid OH group.

As far as is known, this compound is not described in the literature.

This compound is soluble in aqueous alkali metal hydroxide solutions, thus yielding the alkali metal salts of the title compound, e.g., the sodium salt.

The methyl ester of DL–6H,7H-cis-7-(o.-carboxyphenylacetamido) - 3 - aminomethyl-ceph-3-eme-4-carboxylic acid, starting material, was prepared by converting DL-6H,7H-cis-7-(o.-carboxy-phenylacetamido) - 3 - acetoxymethyl-ceph-3-eme-4-carboxylic acid into the methyl ester of DL - 6H,7H-cis-7-(o.-carboxy-phenylacetamido)-3-azidomethyl-ceph-3-eme-4-carboxylic acid, which was then reduced, following the procedure described in Example 1.

DL - 6H,7H-cis-7-(o.-carboxy-phenylacetamido)-3-acetoxymethyl-ceph-3-eme-4-carboxylic acid was itself obtained by subjecting DL-6H,7H-cis-7-amino-3-acetoxymethyl - ceph - 3 - eme-4-carboxylic acid to the action of homophthalic acid chloride under Schotten-Baumann condition.

EXAMPLE 4

Preparation of the γ-lactam of DL-6H,7H-cis-7-(p.sulfonyl-phenylacetamido) - 3 - aminomethyl-ceph-3-eme-4-carboxylic acid Using the same procedure as described in Example 1, but starting from the methyl ester of DL-6H,7H-cis-7-(p.-sulfonyl-phenylacetamido) - 3 - aminomethyl-ceph-3-eme-4-carboxylic acid, there was obtained the γ-lactam of DL-6H,7H-cis-7-(p.-sulfonyl-phenylacetamido) - 3 - aminomethyl-ceph-3-eme-4-carboxylic acid which is soluble in aqueous alkali metal hydroxide solutions, thus yielding the corresponding alkali metal salts, e.g. the sodium salt. The sodium salt was purified by recrystallization from a water-dioxan mixture.

The values of the microanalysis below were calculated by taking into account its solvation with ½ molecule of dioxan.

Analysis.—Calculated for $C_{18}H_{18}O_7N_3S_2Na$ (percent): molecular weight=475.46. C, 45.44; H, 3.82; N, 8.84; S, 13.48. Found (percent): C, 45.1; H, 4.0; N, 8.8; S, 13.2.

I.R. Spectrum (in nujol): β-lactam at 1781 cm.⁻¹; C=0 of an amide=1698 and 1655 cm.⁻¹; 2nd amide= 1560 cm.⁻¹. Absorption in the associated OH/NH region.

As far as is known, this compound is not described in the literature.

The methyl ester of DL-6H,7H-cis-7-(p.-sulfonyl-phenylacetamido)-3-aminomethyl-ceph - 3 - eme-4-carboxylic acid, starting material, was prepared by converting DL-6H,7H-cis-7-(p.-sulfonyl-phenylacetamido) - 3 - acetoxymethyl-ceph-3-eme-4-carboxylic acid into the methyl ester of DL-6H,7H-cis - 7 - (o.-sulfonyl-phenylacetamido)-3-azidomethyl-ceph-3-eme-4-carboxylic acid, which was then reduced, following the process described in Example 1.

DL-6H,7H-cis-7-(p.-sulfonyl-phenylacetamido) - 3-acetoxymethyl-ceph-3-eme-4-carboxylic acid was itself obtained by reacting DL-6H,7H-cis-7-amino-3-acetoxymethyl-ceph-3-eme-4-carboxylic acid with p.-sulfonyl-phenylacetic acid in the presence of dicyclohexylcarbodiimide.

EXAMPLE 5

Preparation of the γ-lactam of DL-6H,7H-cis-7-(p.-amino-phenylacetamido) 3 - aminomethyl-ceph-3-eme-4-carboxylic acid and of its hydrochloride By using the same procedure as described in Example 1, but starting from the methyl ester of DL-6H,7H-cis-7-(p.-amino-phenylacetamido) - 3 - aminomethyl-ceph-3-eme-4-carboxylic acid, there was obtained the γ-lactam of DL-6H,7H-cis-7-p.-amino-phenylacetamido - 3 - aminomethyl-ceph-3-eme-4-carboxylic acid in the form of straw-yellow crystals melting over 250° C.

*Analysis.*—Calculated for $C_{16}H_{16}O_3N_4S$ (percent): molecular weight=344.39. C, 55.8; H, 4.7; N, 16.26; S, 9.3. Found (percent): C, 55.5; H, 4.9; N, 16.1; S, 9.1.

As far as is known, this compound is not described in the literature.

This compound was converted into its hydrochloride by usual methods; melting point over 250° C.

The methyl ester of DL-6H,7H-cis-7-(p.-amino-phenylacetamido)-3-aminomethyl-ceph-3-eme - 4-carboxylic acid used as starting material was prepared by converting DL-6H,7H-cis - 7 - (p.-amino-phenylacetamido) - 3 - acetoxyceph-3-eme-4-carboxylic acid into the methyl ester of DL-6H,7H-cis-7-(p.-amino-phenylacetamido) - 3 - azidomethyl-ceph-3-eme- 4-carboxylic acid, which was then reduced, following the procedure described in Example 1.

DL-6H,7H-cis-7-(p.-amino-phenylacetamido) - 3 - acetoxymethyl-ceph-3-eme-4-carboxylic acid was itself prepared in the following manner:

p.-Amino-phenylacetic acid was treated with trityl chloride thus yielding p.-tritylamino-phenylacetic acid; this acid was reacted with DL-6H,7H-cis-7-amino-3-acetoxymethyl-ceph-3-eme-4-carboxylic acid in the presence of dicyclohexylcarbodiimide to give DL-6H,7H-cis-7-(p.-tritylamino-phenylacetamido) - 3 - acetoxymethyl-ceph-3-eme-4-carboxylic acid, which was detritylated by the action of gaseous hydrochloric acid followed by neutralization with triethylamine.

EXAMPLE 6

Preparation of the γ-lactam of L(+)-6H,7H-cis-7-(p.-amino-phenylacetamido) - 3-aminomethyl-ceph-3-eme-4-carboxylic acid and of its hydrochloride Following the same procedure as described in Example 5 but starting from the methyl ester of L(+)-6H,7H-cis-7-(p.-amino-phenylacetamido) - 3 - aminomethyl-ceph-3-eme-4-carboxylic acid, there was obtained the γ-lactam of L(+)-6H,7H-cis - 7 - (p.-amino-phenylacetamido)-3-aminomethyl-ceph-3-eme-4-carboxylic acid, having a rotatory power $[\alpha]_D^{20}$=+147°±3.5° (c.=0.7%, dimethylformamide).

This compound was converted by usual method into its hydrochloride, which is soluble in water, insoluble in alcohol, and melts above 250° C.; rotatory power=$[\alpha]_D^{20}$= +147°±3° (c.=0.7%, dimethylformamide).

As far as is known, these compounds are not described in the literature.

The methyl ester of L(+)-6H,7H-cis-7-(p.-aminophenylacetamido)-3-aminomethyl-ceph - 3-eme-4-carboxylic acid, starting material, was prepared by converting L(+)-6H,7H-cis-7-(p.-amino-phenylacetamido) - 3 - acetoxymethyl-ceph-3-eme-4-carboxylic acid into the methyl ester of L(+)-6H,7H-cis-7-(p.-amino-phenylacetamido)-3-azidomethyl-ceph-3-eme-4-carboxylic acid, which was then reduced, following the procedure shown in Example 1.

The L(+)-6H,7H-cis - 7 - p.-amino-phenylacetamido-3-acetoxymethyl-ceph-3-eme-4-carboxylic acid was itself prepared from L(+)-6H,7H-cis - 7 - amino-3-acetoxymethyl-ceph-3-eme-4-carboxylic acid following the method described in Example 5.

As has been previously indicated, the novel derivatives of cephalosporine of the Formula I exhibit particularly marked antibiotic properties and are utilized as similar cephalosporine antibiotics against infections caused by gram positive bacteria, particularly against staphylococci infections.

The novel therapeutic compositions of the invention are comprised of a safe and effective amount of at least one compound of Formula I and a major amount of a pharmaceutical carrier. The novel method of the invention of combatting microbial infections in humans and animals comprises administering to humans and animals a safe and effective amount of a compound of Formula I.

The useful dosology is controlled between 20 mg./kg. and about 40 mg./kg. per dose and between about 20 mg./kg. and about 160 mg./kg. per day in warm-blooded animals and between 1 gm. and 2 gm. per dose and 1 gm. to 8 gm. per day in the adult as a function of the method of administration.

For example, the γ-lactam of L-7-(2'-thienyl-acetamido)-3-aminomethyl-ceph-3-eme-4-carboxylic acid (I, where $R_1$ is 2-thienyl-acetyl and $R_2$ is hydrogen) possesses, in particular, in interesting antibiotic activity in vivo against staphylococci. This compound can be utilized in the treatment of warm-blooded animals of infections due to staphylococci.

The γ-lactam of L-7-(2'-thienyl-acetamido)-3-aminomethyl-ceph-3-eme-4-carboxylic acid is utilized orally, transcutaneously, subcutaneously, topically or rectally. It can be presented in the customary forms of injectable solutions or suspensions, put up in ampoules, multiple-dose flacons, tablets, coated tablets, aromatized powders, granules, emulsions, syrups, suppositories, ovules, pomades, creams, collutories and pulverized topical powders.

EXAMPLE 7

Pharmacological study of the γ-lactam of L-7-(2'-thienyl-acetamido)-3 - aminomethyl-ceph - 3 - eme-4-carboxylic acid (1) *Activity in vitro.*—The minimum inhibitory concentrations (m.i.c.) of the γ-lactam of L-7-(2'-thienyl-acetamido)-3-aminomethyl-ceph-3-eme-4-carboxylic acid were determined under standard conditions against various staphylococci. These results are as follows:

|  | μg./ml. |
|---|---|
| *Staphylococcus aureus* oxford | 0.2 |
| *Staphylococcus aureus* of clinical origin | 2 |

(2) *Activity in vivo.*—These tests of the γ-lactam of L-7-(2'-thienyl-acetamido)-3-aminomethyl - ceph - 3 eme-4-carboxylic acid were effected in connection with experimental staphylococci infections in mice, utilizing 10 animals for each dose. The therapeutic effect was determined from the mortality of the animals during the test. For each series, the active compound of the invention was administered subcutaneously in two successive doses at an interval of 16 hours. The results are as follows:

(A) Infections caused by a penicillin-sensitive staphylococci (strain TIN):

Therapeutic effect (average of two tests) corresponding to the unitary doses per mouse.

|  | Percent |
|---|---|
| 10 mg. | 100 |
| 5 mg. | 98.5 |
| 2 mg. | 72 |

(B) Infections caused by a penicillin-resistant staphylococci (strain BEN, resistant to 10,000 I.U. of penicillin G per mouse):

Therapeutic effect (average of two tests) corresponding to the unitary doses per mouse.

| | Percent |
|---|---|
| 10 mg. | 70 |
| 5 mg. | 49 |
| 2 mg. | 0 |

The γ-lactam of L-7-(2′-thienyl-acetamido)-3-aminomethyl-ceph-3-eme-4-carboxylic acid therefore presents in vitro a good antistaphylococci activity. In vivo, the compound (injected subcutaneously in mice) presents a good therapeutic efficacy in experimental staphylococci infections.

The preceding specific embodiments are illustrative of the practice of the invention. It is to be understood, however, that other expedients known to those skilled in the art can be employed without departing from the spirit of the invention.

We claim:

1. A cephalosporine derivative selected from the group consisting of racemic and optically active derivatives of the formula

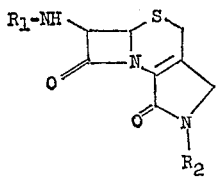

wherein $R_1$ represents the acyl of an organic acid selected from the group consisting of lower alkanoic acid, thienyl-lower alkanoic acid, carboxyphenyl-lower alkanoic acid, sulfonylphenyl-lower alkanoic acid, aminophenyl-lower alkanoic acid and phenyl-lower alkanoic acid and $R_2$ represents a member selected from the group consisting of hydrogen, lower alkyl and phenyl-lower alkyl, and, when $R_1$ contains carboxyl or sulfonyl, their alkali metal salts and, when $R_1$ contains amino groups, their therapeutically-acceptable acid addition salts.

2. The compound of claim 1 wherein $R_1$ is 2-thienyl-acetyl and $R_2$ is hydrogen.

3. The compound of claim 1 wherein $R_1$ is o.-carboxyphenylacetyl and $R_2$ is hydrogen, and the corresponding alkali metal salts.

4. The compound of claim 1 wherein $R_1$ is p.-sulfonylphenylacetyl and $R_2$ is hydrogen, and the corresponding alkali metal salts.

5. The compound of claim 1 wherein $R_1$ is p.-aminophenylacetyl and $R_2$ is hydrogen, and the corresponding hydrochloride.

6. A process for the production of a cephalosporine derivative of claim 1 which comprises the steps of lactamizing a compound of the formula

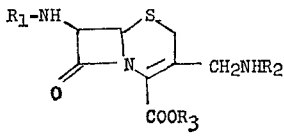

wherein $R_1$ represents the acyl of an organic acid selected from the group consisting of lower alkanoic acid, thienyl-lower alkanoic acid, carboxyphenyl-lower alkanoic acid, sulfonylphenyl-lower alkanoic acid, aminophenyl-lower alkanoic acid and phenyl-lower alkanoic acid and $R_2$ represents a member selected from the group consisting of hydrogen, lower alkyl and phenyl-lower alkyl, and $R_3$ represents a member selected from the group consisting of hydrogen, lower alkyl and phenyl-lower alkyl by a process selected from the group consisting of (1) gentle heating in the presence of an organic solvent selected from the group consisting of lower alkanol, chlorinated hydrocarbon solvent, nitrated lower alkane, acetone, dimethylformamide, tetrahydrofuran and acetonitrile, and (2) by the action of a lactamizating agent selected from the group consisting of carboxyl and sulfonyl and said cephalosporine derivative is recovered in the form of its from the group consisting of dimethylformamide and nitrated lower alkane, and recovering said cephalosporine derivative.

7. A process as claimed in claim 6, wherein the lactamization is effected in an organic solvent by process (1).

8. A process as claimed in claim 6, wherein the lactamization is effected by the action of a lactamizing agent in an organic solvent by process (2).

9. The process of claim 6 wherein $R_1$ is the acyl of an organic acid containing a substituent selected from the group consisting of carboxyl and sulfonyl and said cephalosporine derivative is recovered in the form of its alkali metal salt.

10. The process of claim 6 wherein $R_1$ is the acyl of an organic acid containing an amino substituent and said cephalosporine derivative is recovered in the form of its therapeutically-acceptable acid addition salt.

References Cited

UNITED STATES PATENTS

| 3,274,186 | 9/1966 | Barker et al. | 260—243 C |
| 3,278,531 | 10/1966 | Cox et al. | 260—243 C |
| 3,454,567 | 7/1969 | Cheney et al. | 260—239.1 |

NICHOLAS S. RIZZO, Primary Examiner

U.S. Cl. X.R.

424—246

UNITED STATES PATENT OFFICE
CERTIFICATE OF CORRECTION

Patent No. 3,658,802  Dated April 25, 1972

Inventor(s) Rene Heymes et al.

It is certified that error appears in the above-identified patent and that said Letters Patent are hereby corrected as shown below:

Column 1, line 69, "3-em" should read -- 3-eme --. Column 2, line 4, "seph" should read -- ceph --. Column 5, line 5, after "obtain" insert -- about --. Column 8, line 29, "in", first occurrence, should read -- an --. Column 10, line 24, Claim 6, after "consisting of" cancel "carboxyl and sulfonyl and said cephalosporine derivative is recovered in the form of its" and insert -- dialkylcarbodiimide and dicycloalkylcarbodiimide in the presence of an organic solvent selected --.

Signed and sealed this 13th day of March 1973.

(SEAL)
Attest:

EDWARD M. FLETCHER, JR.
Attesting Officer

ROBERT GOTTSCHALK
Commissioner of Patents